Feb. 9, 1932.  R. R. GOSSARD  1,844,279
HAY CHOPPER AND SPREADER
Filed April 17, 1931   2 Sheets-Sheet 1
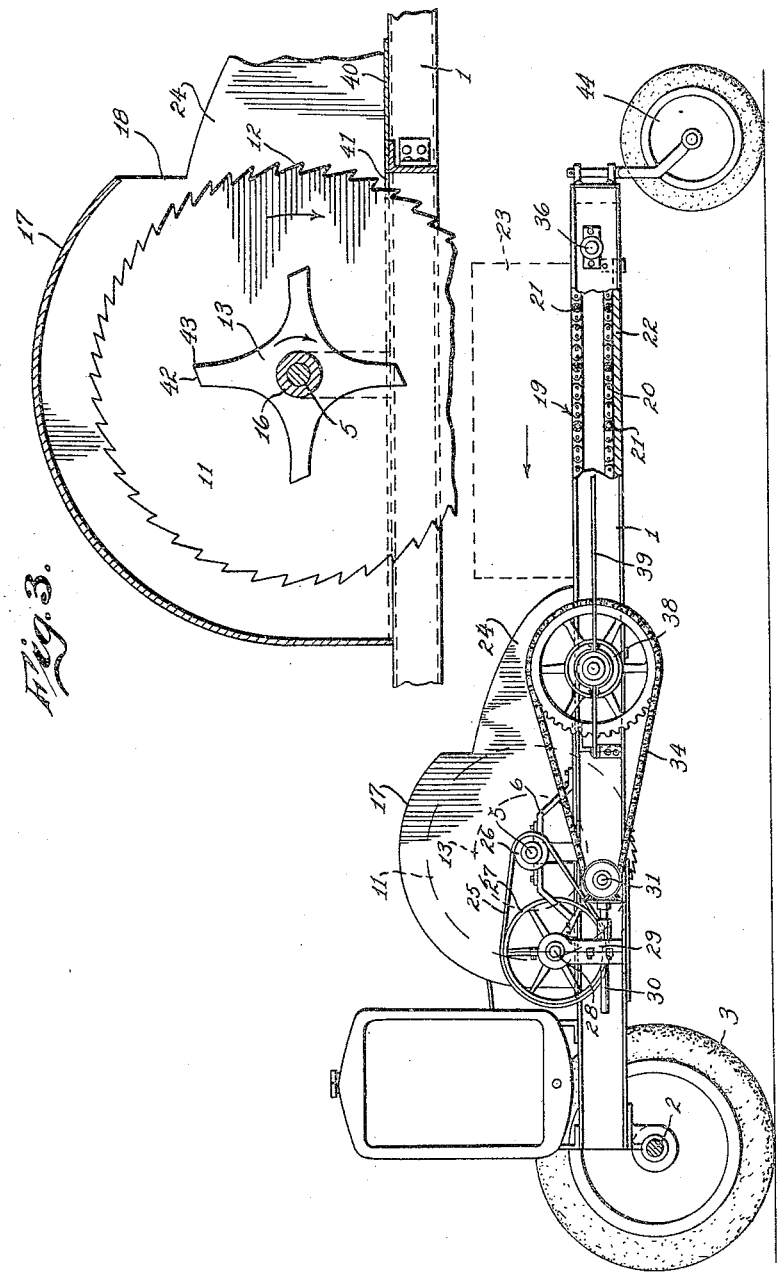
Inventor
Roy R. Gossard;
By Lyon & Lyon
Attorneys

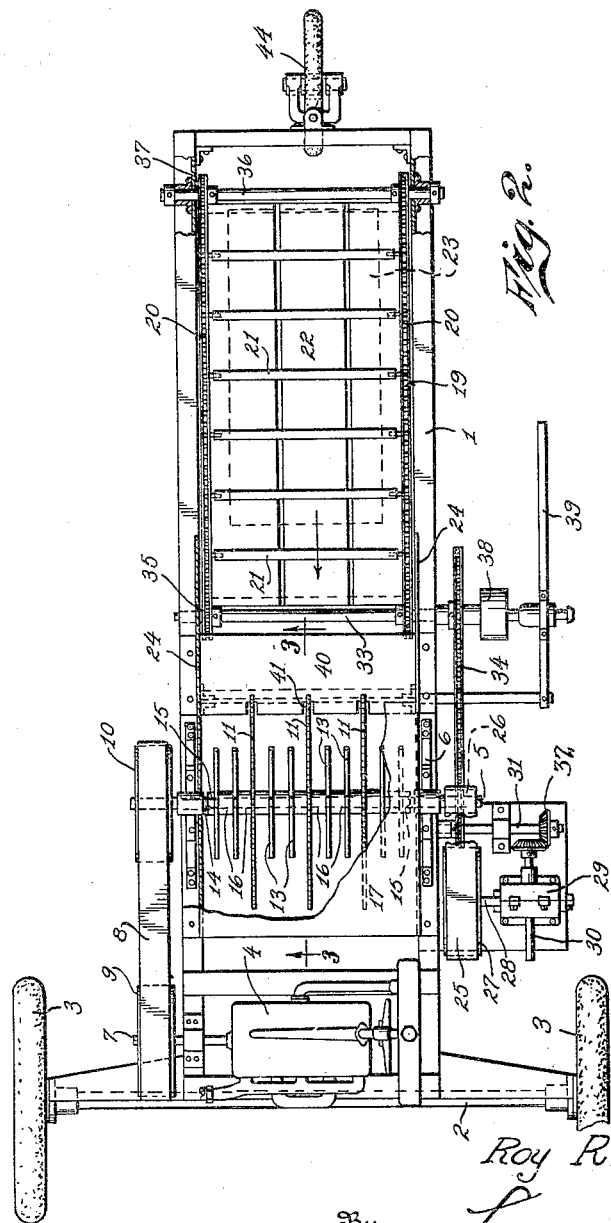

Patented Feb. 9, 1932

1,844,279

UNITED STATES PATENT OFFICE

ROY R. GOSSARD, OF GLENDORA, CALIFORNIA

HAY CHOPPER AND SPREADER

Application filed April 17, 1931. Serial No. 530,744.

This invention relates to apparatus for chopping and spreading hay or straw over the ground to fertilize the earth. It is common practice to do this in orchards, and this has usually been effected by chopping the hay and then spreading it over the ground. As ordinarily accomplished, the work of chopping and spreading the hay involves considerable labor and such methods are, therefore, relatively expensive. The hay employed for this purpose is usually hay that has become spoiled, and it is generally in the form of bales.

The general object of this invention is to provide apparatus capable of receiving baled hay, from which the baling wires have been removed and which will operate to chop up the hay and spread it on the ground as the implement advances. It sometimes happens that the hay will carry sticks or stones or pieces of baling wire as it passes into the cutters or saws of the machine, and one of the objects of the invention is to provide means whereby such a solid body will do no injury to the saws.

Further objects of the invention will appear hereinafter.

The invention consists in the novel parts and combinations of parts to be described hereinafter, all of which contribute to produce an efficient hay chopper and spreader.

A preferred embodiment of the invention is described in the following specification, while the broad scope of the invention is pointed out in the appended claims.

In the drawings:—

Figure 1 is a side elevation and partial section of apparatus embodying my invention;

Fig. 2 is a plan of the apparatus, illustrated in Fig. 1, with a portion of the housing or hood of the cutters broken away;

Fig. 3 is a vertical section taken about on the line 3—3 of Fig. 2 upon an enlarged scale.

Before proceeding to a detailed description of the apparatus, it should be stated that it is preferably mounted on a wheeled frame capable of being advanced or drawn over the ground. For this purpose, it is preferable to mount the apparatus on a light-wheeled frame, which can be attached as a trailer to a tractor or farm wagon.

Referring more particularly to the parts, 1 represents the frame of the implement, which is of substantially rectangular form like the frame of a vehicle and provided at its forward end with an axle 2 carrying wheels 3, which, if desired, may be provided with a driving connection (not illustrated) enabling the wheel to be driven from an engine 4, such as a gas engine.

Near the engine I provide a transverse shaft 5, which may be supported in a slightly elevated position on bearing brackets 6, and this shaft may be driven in any suitable manner from the engine shaft 7. In the present instance, this drive is effected by means of a belt 8 and belt pulleys 9 and 10. These pulleys are of substantially the same diameter, so that the shaft 5 will be rotated at the same speed as the engine. The speed of rotation of the shaft 5 is of some importance, as will be pointed out hereinafter. On the shaft 5 I provide a plurality of rotary cutters 11, for chopping the hay, and these are preferably in the form of disc saws having forwardly projecting teeth 12 on their peripheries (see Fig. 3). These saws are preferably mounted on the shaft so that they are driven yieldingly through a friction drive.

Adjacent to the saws, that is to say, beyond the outside saws and between the saws, I provide rotary beaters 13, which are preferably employed in pairs disposed a short distance apart; that is to say, I provide two such beaters in the spaces between the saws and one or more outside of the end saws. In order to secure the saws and beaters to effect their rotation, I provide an upset thread 14 near each side of the implement frame to receive a clamping nut 15. Between the saws and the beaters I provide loose collars 16 which operate as distance pieces to hold the beaters and saws apart and which also transmit frictionally rotation from the nuts 15 to the saws and beaters. The direction of rotation of the shaft is indicated by the arrow in Fig. 3, and for this direction of rotation the thread 14 should be a right-hand thread so that any rotation of the cutter caused by the driving resistance will have the effect of tightening the nuts instead of loosening them. In this way the saws and beaters operate automatically to keep the nuts 15 screwed up tight. The saws and beaters are preferably covered by a hood or housing 17 (see Fig. 3) which has an opening 18 on its forward side where the baled hay is fed into contact with the saws.

In order to feed the baled hay into the saws, I prefer to provide an endless conveyor 19 having two sprocket chains 20, one at each side (see Fig. 2), connected by cross-bars 21 that move along over a floor 22. The bale of hay indicated by the dotted line 23 is deposited on the conveyor with its longitudinal axis extending in the direction of feed, that is to say, toward the cutters 11.

In order to guide the bale as it moves through the opening 18 into contact with the saws, I prefer to provide the end walls of the hood 17 with side plates or guards 24 that project out along the side rails of the frame 1 (see Fig. 1).

The conveyor, if desired, may be driven through reduction gearing either directly from the engine or from the shaft 5 of the saws. As illustrated in the drawings, this drive is effected through the medium of a belt 25 (see Fig. 1) that runs over a small belt pulley 26 on the end of the shaft 5, so as to drive a relatively large pulley 27 on the shaft 28 of a reduction gear 29, the driven shaft 30 of which drives a countershaft 31 through beveled gears 32, and this countershaft 31 drives a cross-shaft 33 of the conveyor through a sprocket chain 34. This cross-shaft 33 carries sprocket wheels 35 over which the chains 20 pass. A similar chain-driven shaft 36 and sprockets 37 are provided in the other end of the conveyor for carrying these side chains 20.

The shaft 33 is provided with a clutch 38 controlled by clutch lever 39 so that the conveyor can be stopped and started at will.

At the point where the hay passes into the opening 18 I prefer to provide a sill-plate 40 (see Fig. 3), which is mounted on the frame and provided at its inner edge with deep notches 41 which receive the edges of the saws 11. This enables the sill-plate to cooperate with the saws in chopping up the hay as it passes into the paths of the arms of the beaters 13.

These arms, as indicated in Fig. 3, are preferably formed with inclined end faces 42. In other words, the ends are cut so as to give a relief at this point and form acute angles or spurs 43 at the forward side of the arms.

It is found in practice that the best results are obtained with this apparatus if the shaft 5 is rotated at about 1300 or 1400 revolutions per minute. This speed is preferably controlled by means of a governor not illustrated (on the engine). It is a curious fact that if the saws are rotated at a slower speed than this they manifest a tendency to become heated, but at the speed mentioned the saws will run cold.

If desired, the rear end of the frame 1 may be provided with a caster wheel 44 for supporting its end of the frame 1.

It is understood that the embodiment of the invention described herein is only one of the many embodiments this invention may take, and I do not wish to be limited in the practice of the invention, nor in the claims, to the particular embodiment set forth.

What I claim is:

1. In a hay chopper and spreader, the combination of a rotary cutter, a wheeled frame for supporting the cutter and enabling the same to be advanced over the ground, beaters located adjacent the cutter, said frame having an opening means for mounting the cutter and beaters for rotation on an axis above said opening, and means for feeding hay into contact with the cutter and beaters, said beaters operating to force the cut hay through the opening and to spread the cut hay on the ground.

2. In apparatus for chopping and spreading baled hay, the combination of a shaft, a wheeled frame for supporting the shaft and enabling the same to be advanced over the ground, a plurality of cutters of disc form mounted for rotation on the shaft said frame having an opening below the shaft, a plurality of beaters mounted adjacent the cutters and rotating with the shaft, and means for feeding the baled hay into contact with the cutters and beaters, said beaters operating to force the cut hay through the opening and to spread the cut hay on the ground.

3. In apparatus for chopping and spreading baled hay, the combination of a shaft, a wheeled frame for supporting the shaft and enabling the same to be advanced over the ground, a plurality of cutters of disc form mounted for rotation on the shaft, a plurality of beaters mounted adjacent the cutters and rotating with the shaft and operating between the cutters, a housing for the cutters and beaters with a side opening and a bottom opening, said cutters and beaters being located above said bottom opening, a conveyor for advancing the baled hay through the side opening and into contact with the cutters and beaters, said beaters operating to spread the chopped hay on the ground.

4. In apparatus for chopping and spreading baled hay, the combination of a shaft, and operating between the cutters, a wheeled frame for supporting the shaft and enabling the same to be advanced over the ground, a plurality of cutters of disc form mounted for rotation on the shaft, a plurality of beaters mounted adjacent the cutters and rotating with the shaft, said cutters having teeth on their peripheries, and said beaters having substantially radial arms for spreading the chopped hay, said housing having an opening below said beaters, said beaters operating to force the cut hay through the opening and spread the cut hay on the ground.

5. In apparatus for chopping and spreading baled hay, the combination of a shaft, a wheeled frame for supporting the shaft and enabling the same to be advanced over the ground, a plurality of cutters of disc form mounted for rotation on the shaft, a plurality of beaters mounted adjacent the cutters and rotating with the shaft, a housing covering the beaters and cutters, with a feed opening in one side, and a conveyor for receiving the baled hay and for feeding the same through the feed opening into contact with the cutters and beaters, said housing having a bottom opening, means for mounting said cutters and beaters in the housing and above the bottom opening, said beaters operating to spread the chopped hay through the bottom opening on to the ground.

6. In apparatus for chopping and spreading baled hay, the combination of a shaft, a wheeled frame for supporting the shaft and enabling the same to be advanced over the ground, a plurality of cutters in the form of disc saws with teeth on their peripheries mounted on the shaft, a plurality of beaters mounted on the shaft adjacent the cutters and having substantially radial arms for spreading the cut hay, a housing for the shaft and beaters having a bottom opening, and means for effecting a yielding drive connection from the shaft to the saws, said beaters operating to force the cut hay through the opening and to spread the cut hay on the ground.

7. In apparatus for chopping and spreading baled hay, the combination of a shaft, a wheeled frame for supporting the shaft and enabling the same to be advanced over the ground, a plurality of cutters in the form of disc saws with teeth on their peripheries mounted on the shaft, a plurality of beaters mounted on the shaft adjacent the cutters and having substantially radial arms for spreading the cut hay, a housing for the shaft and beaters having a bottom opening, and means for clamping the saws and beaters on the shaft, so that they are driven through a friction drive, thereby enabling the saws to stop their rotation if they come in contact with a solid body in the hay, said beaters operating to force the cut hay through the opening and to spread the cut hay on the ground.

8. In a hay chopper and spreader, the combination of a housing having an opening on its underside and having an opening in its side wall, a shaft rotatably mounted within the housing above said first-named opening, cutters mounted on the shaft and disposed apart for chopping the hay, and beaters carried by the shaft between the cutters, an endless conveyer for delivering bales of hay through the side opening of the housing into contact with the cutters and beaters, said beaters operating to spread the chopped hay on the ground through the bottom opening of the housing.

9. In a hay chopper and spreader, the combination of a housing having an exit opening and having an inlet opening, a shaft rotatably mounted within the housing, cutters mounted on the shaft and spaced apart for chopping hay, and beaters carried by the shaft between the cutters, an endless conveyer for delivering bales of hay through the inlet opening of the housing into contact with the cutters and beaters, said beaters operating to spread the chopped hay on the ground through the exit opening of the housing.

10. In apparatus for chopping and spreading baled hay, the combination of a shaft, a wheeled frame for supporting the shaft and enabling the same to be advanced over the ground, a plurality of cutters in the form of disc saws with teeth on their peripheries mounted on the shaft, a plurality of beaters mounted on the shaft adjacent the cutters and having substantially radial arms for spreading the cut hay, a housing for the shaft and beaters having a bottom opening, means for clamping the saws and beaters on the shaft so that they are driven through a friction drive, thereby enabling the saws to stop their rotation if they come in contact with a solid body in the hay, a sill-plate having notches receiving the edges of the saws, and means for feeding the baled hay across the sill-plate into contact with the saws and beaters, said beaters operating to force the cut hay through the opening and to spread the cut hay on the ground.

Signed at Los Angeles, Cal., this 23rd day of March, 1931.

ROY R. GOSSARD.